US012206255B2

(12) United States Patent
Narayana Bhat et al.

(10) Patent No.: US 12,206,255 B2
(45) Date of Patent: Jan. 21, 2025

(54) WIRELESS POWER TRANSMISSION USING MULTIPLE TRANSMITTERS AND RECEIVERS (71) Applicant: GE Hybrid Technologies, LLC, Niskayuna, NY (US)

(72) Inventors: Suma Memana Narayana Bhat, Bangalore (IN); Viswanathan Kanakasabai, Bangalore (IN); Deepak Aravind, Bangalore (IN)

(73) Assignee: Dolby Laboratories Inc., San Francisco, CA (US)

( * ) Notice: Subject to any disclaimer, the term of this patent is extended or adjusted under 35 U.S.C. 154(b) by 440 days.

(21) Appl. No.: 17/420,101

(22) PCT Filed: Dec. 17, 2019

(86) PCT No.: PCT/US2019/066827
§ 371 (c)(1),
(2) Date: Jun. 30, 2021

(87) PCT Pub. No.: WO2020/142201
PCT Pub. Date: Jul. 9, 2020

(65) Prior Publication Data
US 2022/0085662 A1    Mar. 17, 2022

(30) Foreign Application Priority Data
Jan. 2, 2019   (IN) .............................. 201941000168

(51) Int. Cl.
H02J 50/40    (2016.01)
H02J 50/00    (2016.01)
(Continued)

(52) U.S. Cl.
CPC .......... *H02J 50/402* (2020.01); *H02J 50/005* (2020.01); *H02J 50/10* (2016.02); *H02J 50/60* (2016.02)

(58) Field of Classification Search
CPC ........ H02J 50/40; H02J 50/402; H02J 50/005; H02J 50/10; H02J 50/60
See application file for complete search history.

(56) References Cited

U.S. PATENT DOCUMENTS 5,995,900 A   11/1999   Hsiao et al.
6,803,744 B1  10/2004   Sabo
(Continued)

FOREIGN PATENT DOCUMENTS

FR    2974952 A1 *  11/2012   ............ B60L 11/182
JP    2008259335      10/2008
(Continued)

OTHER PUBLICATIONS

Machine translation of FR-2974952-A1 (Year: 2024).*
(Continued)

*Primary Examiner* — David V Henze-Gongola
(74) *Attorney, Agent, or Firm* — DeLizio, Peacock, Lewin & Guerra, LLP (57) ABSTRACT This disclosure provides systems, devices, apparatus and methods, including computer programs encoded on storage media, for wireless power transmission. A wireless power transmission apparatus (such as a charging pad) may provide multiple wireless power signals to a wireless power receiving apparatus. The wireless power receiving apparatus may combine wireless power received from multiple secondary coils to provide a combined wireless power signal to a load, such as a battery charger or electronic device. In some implementations, each set of primary coil and secondary coil may utilize low power wireless power signals (such as 15
(Continued)

Watts or less) in accordance with a wireless charging standard. By combining wireless energy from multiple low power wireless power signals, the wireless power receiving apparatus may support higher power requirements of an electronic device. The disclosed designs may minimize electromagnetic interference (EMI) and provide greater efficiency of wireless power transfer.

25 Claims, 7 Drawing Sheets

(51) Int. Cl.
*H02J 50/10* (2016.01)
*H02J 50/60* (2016.01)

(56) References Cited

U.S. PATENT DOCUMENTS

| | | | |
|---|---|---|---|
| 8,629,654 | B2 | 1/2014 | Partovi et al. |
| 9,112,363 | B2 | 8/2015 | Partovi |
| 9,130,394 | B2 | 9/2015 | Burdo et al. |
| 9,190,876 | B2 | 11/2015 | Mayo et al. |
| 9,252,628 | B2 | 2/2016 | Leabman et al. |
| 9,409,490 | B2 | 8/2016 | Kawashima |
| 9,796,280 | B2 | 10/2017 | McCool et al. |
| 9,837,846 | B2 | 12/2017 | Partovi |
| 9,912,173 | B2 | 3/2018 | Tseng |
| 10,008,887 | B2 | 6/2018 | Zeine |
| 10,044,229 | B2 | 8/2018 | Partovi et al. |
| 10,148,097 | B1 | 12/2018 | Leabman et al. |
| 2007/0182367 | A1* | 8/2007 | Partovi ............ H02J 50/12 320/108 |
| 2011/0199028 | A1 | 8/2011 | Yamazaki et al. |
| 2011/0304220 | A1 | 12/2011 | Whitehead |
| 2012/0139358 | A1* | 6/2012 | Teggatz ............ H01F 38/14 307/104 |
| 2012/0262108 | A1 | 10/2012 | Olson et al. |
| 2013/0043734 | A1 | 2/2013 | Stone et al. |
| 2013/0069586 | A1 | 3/2013 | Jung et al. |
| 2013/0249479 | A1 | 9/2013 | Pastovi |
| 2014/0191568 | A1 | 7/2014 | Partovi |
| 2014/0203769 | A1* | 7/2014 | Keeling ............ B60L 53/38 320/108 |
| 2015/0051750 | A1 | 2/2015 | Kurs et al. |
| 2015/0115727 | A1 | 4/2015 | Carobolante et al. |
| 2015/0194837 | A1* | 7/2015 | Tom ............ H02J 50/80 320/108 |
| 2015/0202677 | A1 | 7/2015 | Ogishi et al. |
| 2015/0214775 | A1 | 7/2015 | Lee et al. |
| 2015/0303699 | A1* | 10/2015 | Wagman ............ H02J 50/10 307/104 |
| 2015/0371771 | A1 | 12/2015 | Abu Qahouq |
| 2016/0020639 | A1 | 1/2016 | Pudipeddi et al. |
| 2016/0094043 | A1 | 3/2016 | Hao et al. |
| 2016/0285317 | A1 | 9/2016 | Maniktala |
| 2016/0308394 | A1 | 10/2016 | Abdolkhani et al. |
| 2016/0336817 | A1 | 11/2016 | Jabori et al. |
| 2017/0133876 | A1 | 5/2017 | Knepper |
| 2017/0271927 | A1 | 9/2017 | Sakata et al. |
| 2017/0317536 | A1 | 11/2017 | Marson et al. |
| 2017/0326992 | A1 | 11/2017 | Budhia et al. |
| 2017/0338684 | A1 | 11/2017 | Mishriki et al. |
| 2018/0013310 | A1 | 1/2018 | Moussaoui et al. |
| 2018/0019624 | A1 | 1/2018 | Chen |
| 2018/0034327 | A1 | 2/2018 | Ren et al. |
| 2018/0052649 | A1 | 2/2018 | Patel |
| 2018/0062416 | A1 | 3/2018 | Terry et al. |
| 2018/0062442 | A1 | 3/2018 | Qiu et al. |
| 2018/0064224 | A1* | 3/2018 | Brzezinski ............ A45C 13/02 |
| 2018/0090954 | A1 | 3/2018 | Graham et al. |
| 2018/0090955 | A1* | 3/2018 | Graham ............ H04B 5/0075 |
| 2018/0090999 | A1 | 3/2018 | Graham et al. |
| 2018/0091000 | A1 | 3/2018 | Jol et al. |
| 2018/0175671 | A1 | 6/2018 | Ren |
| 2018/0257502 | A1 | 9/2018 | Park |
| 2018/0278099 | A1 | 9/2018 | Hong et al. |
| 2018/0301933 | A1 | 10/2018 | Lee et al. |
| 2018/0301936 | A1 | 10/2018 | Lee et al. |
| 2020/0313464 | A1 | 10/2020 | Leabman |
| 2022/0385112 | A1 | 12/2022 | Kanakasabai et al. |

FOREIGN PATENT DOCUMENTS

| | | |
|---|---|---|
| JP | 2010051137 | 3/2010 |
| JP | 2010226836 | 10/2010 |
| JP | 5288653 | 5/2013 |
| JP | 2014090528 | 5/2014 |
| JP | 2014180078 | 9/2014 |
| JP | 2017169277 | 9/2017 |
| KR | 20130102218 | 9/2013 |
| KR | 20140097362 | 8/2014 |
| WO | 2014035987 | 3/2014 |
| WO | 2014082571 | 6/2014 |
| WO | 2016005984 | 1/2016 |
| WO | 2017120357 | 7/2017 |
| WO | 2017176128 | 10/2017 |
| WO | 2018057656 | 3/2018 |
| WO | 2018111820 | 6/2018 |
| WO | 2018115991 | 6/2018 |
| WO | 2018190985 | 10/2018 |
| WO | 2020142201 | 7/2020 |
| WO | 2021096866 | 5/2021 |

OTHER PUBLICATIONS

"Korean application 10-2021-7024326 Request for Submission of Opinion", Sep. 1, 2023, 8 pages.
"India Application No. 201941000168 First Examination Report", Jun. 4, 2021, 6 pages.
"PCT International Application PCT/US2019/066827 International Search Report and Written Opinion", Apr. 24, 2020, 13 pages.
Chen, "Localization and Free Positioning with a Cooperative Multiple Coil Transmitter for Wireless Power Transfer", From the Faculty of Engineering, Department of Electrical Engineering and Information Technology the University of Duisburg-Essen, Nov. 24, 2017, 243 pages.
Lim, et al., "Positioning-Free Magnetically Resonant Wireless Power Transmission Board with Staggered Repeater Coil Array (SRCA)", 2012 IEEE MTT-S International Microwave Workshop Series on Innovative Wireless Power Transmission: Technologies, Systems, and Applications, May 10-11, 2012, 93-96.
Pu, et al., "A New Definition of Power Transmission Efficiency for Wireless Charging Systems By Using Coil Arrays", 2013 IEEE Antennas and Propagation Society International Symposium (APSURSI), 2013, 1434-1435.
"Chinese Application No. 201980086969 First Office Action", Feb. 23, 2022, 10 pages.
"Taiwan Patent Application No. 109100007 Office Action", May 31, 2023, 12 pages.
"Chinese Application No. 201980086969.6 Second Office Action", Jul. 6, 2022, 9 pages.
"PCT Application No. PCT/US2020/059851 International Search Report and Written Opinion", Feb. 5, 2021, 13 pages.
Lu, et al., "Wireless Charger Networking for Mobile Devices: Fundamentals, Standards, and Applications", Dec. 9, 2014, 16 pages.
Lu, et al., "Wireless Charging Technologies: Fundamentals, Standards, and Network Applications", IEEE Communications Surveys and Tutorials, To Appear, Nov. 14, 2015, 40 pages.
"European Patent Office patent application No. 19842453.3 Communication pursuant to Article 94", Nov. 22, 2023, 12 pages.
"India patent application No. 201911045900 Hearing Notice", Mar. 12, 2024, 3 pages.
"U.S. Appl. No. 17/755,940 Non Final Office Action", Mar. 29, 2024, 9 pages.
Takahashi, et al., "A Cuttable Wireless Power Transfer Sheet", Proc. ACM Interact Mob. Wearable Ubiquitous TechnoL, vol. 2, No. 4, Article 190. Publication date: Dec. 2018., Dec. 2018, 25 pages.

(56) References Cited

OTHER PUBLICATIONS

"Korea patent application No. 10-2021-7024326 Final Office Action", May 28, 2024, 3 pages.
"Japan Patent Application No. 2022-527041 1st Office Action", Sep. 3, 2024, 7 pages.

\* cited by examiner

WIRELESS POWER TRANSMISSION USING MULTIPLE TRANSMITTERS AND RECEIVERS

RELATED APPLICATIONS

This Patent Application claims the priority benefit of India Patent Application No. 201941000168, filed Jan. 2, 2019, entitled "Wireless Power Transmission Using Multiple Transmitters and Receivers" and assigned to the assignee hereof. The disclosure of the aforementioned application is considered part of and are incorporated by reference in this Patent Application.

TECHNICAL FIELD

This disclosure relates generally to wireless power, and more specifically, to a wireless power transmission system.

DESCRIPTION OF THE RELATED TECHNOLOGY

Conventional wireless power systems have been developed with a primary objective of charging a battery in a wireless power receiving apparatus, such as a mobile device, a small electronic device, gadget, or the like. In a conventional wireless power system, a wireless power transmission apparatus may include a primary coil that produces an electromagnetic field. The electromagnetic field may induce a voltage in a secondary coil of a wireless power receiving apparatus when the secondary coil is placed in proximity to the primary coil. In this configuration, the electromagnetic field may transfer power to the secondary coil wirelessly. The power may be transferred using resonant or non-resonant inductive coupling between the primary coil and the secondary coil. The wireless power receiving apparatus may use the received power to operate or may store the received energy in a battery for subsequent use.

SUMMARY

The systems, methods and apparatuses of this disclosure each have several innovative aspects, no single one of which is solely responsible for the desirable attributes disclosed herein.

One innovative aspect of the subject matter described in this disclosure can be implemented in a wireless power receiving apparatus. In some implementations, the wireless power receiving apparatus may include a plurality of secondary coils. Each secondary coil may be capable of receiving wireless power from a different primary coil of a plurality of primary coils of a wireless power transmission apparatus.

In some implementations, the wireless power receiving apparatus may include a receive controller configured to deactivate at least one of the secondary coils to avoid receipt of the wireless power;

The wireless power receiving apparatus may include circuitry coupled to the plurality of secondary coils and configured to provide combined wireless power from multiple secondary coils to a load.

In some implementations, the wireless power receiving apparatus may include an electrical interface to couple the wireless power receiving apparatus to an electronic device. The circuitry may provide the combined wireless power to the load via the electrical interface.

In some implementations, the wireless power receiving apparatus may include a housing for the plurality of secondary coils. The housing may be configured to attach to the electronic device. The load may be in the electronic device.

In some implementations, the load may include a battery charger of an electronic device.

In some implementations, each of the plurality of secondary coils may be capable of inductive reception of a low power wireless signal in accordance with a wireless charging standard.

In some implementations, the circuitry may be configured to combine wireless power from multiple low power wireless signals from different secondary coils.

In some implementations, the circuitry may be configured to provide the combined wireless power as a high-power signal to the load.

In some implementations, each of the multiple low power wireless signals may not be over 15 Watts. The combined wireless power may be over 15 Watts.

In some implementations, the plurality of secondary coils may be arranged in an overlapping pattern.

In some implementations, the wireless power receiving apparatus may include at least one controller configured to manage one or more secondary coils. The controller may be configured to separately communicate measurement signals and control error signal to a primary coil in proximity to the secondary coil.

In some implementations, the multiple secondary coils may include a first secondary coil and a second secondary coil. The first secondary coil and the second secondary coil may contribute same amounts of wireless power to the combined wireless power.

In some implementations, the multiple secondary coils may include a first secondary coil and a second secondary coil. The first secondary coil and the second secondary coil may contribute different amounts of wireless power to the combined wireless power.

In some implementations, the different amounts of wireless power contributed by the first secondary coil and the second secondary coil may be based, at least in part, on an alignment of the first secondary coil and the second secondary coil to a first primary coil and a second primary coil, respectively.

One innovative aspect of the subject matter described in this disclosure can be implemented in a wireless power transmission apparatus. In some implementations, the wireless power transmission apparatus may include a plurality of primary coils. Each primary coil may be capable of transmitting wireless power to a different secondary coil of a wireless power receiving apparatus. The wireless power transmission apparatus may include at least one controller configured to separately cause one or more primary coils to transmit wireless power in response to a determination that a secondary coil of the wireless power receiving apparatus is in proximity to the one or more primary coils.

In some implementations, the wireless power transmission apparatus may include a charging pad housing the plurality of primary coils on which the wireless power receiving apparatus may be placed.

In some implementations, the charging pad may include a surface on which the wireless power receiving apparatus may be placed in any orientation.

In some implementations, each of the plurality of primary coils may be capable of inductive transmission of a low power wireless power signal in accordance with a wireless charging standard.

In some implementations, the plurality of primary coils may be arranged in an overlapping pattern.

In some implementations, the wireless power transmission apparatus may include a supervisory controller configured to manage an amount of power transmitted by each of multiple primary coils to corresponding multiple secondary coils of the wireless power receiving apparatus.

In some implementations, the supervisory controller may be configured to manage the amount of power transmitted by each of the multiple primary coils by setting a limit on the power transmitted by one or more of the multiple primary coils.

In some implementations, the limit may be set based, at least in part, on power sharing by the multiple primary coils.

In some implementations, the limit may be set based, at least in part, on a thermal or electrical hardware characteristic of a primary coil.

In some implementations, the one or more primary coils that transmit wireless power to corresponding secondary coils do not include primary coils that are misaligned with a secondary coil of the wireless power receiving apparatus.

Another innovative aspect of the subject matter described in this disclosure can be implemented as a method performed by a wireless power receiving apparatus. In some implementations, the method may include detecting, by a receive controller, a condition in certain of a plurality of secondary coils of a wireless power apparatus. The method may include deactivating, by a receive controller, the certain of the plurality of secondary coils based on detection of the condition. The method may also include receiving, by multiple of the plurality of secondary coils of the wireless power receiving apparatus, wireless power from the wireless power transmission apparatus. The method may also include powering a load associated with the wireless power receiving apparatus using a combined wireless power from the multiple secondary coils.

In some implementations, the method may further include determining a desired power amount for each active one of the plurality of secondary coils such that all active ones of the plurality of secondary coils contribute the combined wireless power. The method may also include activating one or more of the plurality of secondary coils In some implementations, the condition based on a misalignment between the certain of the plurality of secondary coils and certain primary coils of the power transmission apparatus.

In some implementations, the deactivating is based on a misalignment between the certain of the plurality of secondary coils and primary coils of the wireless power transmission apparatus.

In some implementations, the deactivating is based on a determination that the load is using less power than the combined wireless power.

Another innovative aspect of the subject matter described in this disclosure can be implemented in a system. In some implementations, the system may include a wireless power transmission apparatus having a plurality of primary coils. Each primary coil may be capable of transmitting wireless power to a different secondary coil of a wireless power receiving apparatus. The wireless power receiving apparatus may have a plurality of secondary coils. Each secondary coil may be capable of receiving wireless power from a different primary coil of the wireless power transmission apparatus. The wireless power receiving apparatus may have circuitry coupled to the plurality of secondary coils and configured to provide combined wireless power from multiple secondary coils to a load. One or more primary coils of the wireless power transmission apparatus may provide power to corresponding secondary coils of the wireless power receiving apparatus based, at least in part, on alignments between the one or more primary coils and the corresponding secondary coils.

In some implementations, each primary coil that transmits wireless power to a corresponding secondary coil may be configured to transmit a low power wireless power signal in accordance with a wireless charging standard.

In some implementations, either or both of the plurality of primary coils and the plurality of secondary coils may be arranged in an overlapping pattern. The overlapping pattern supports free positioning of the wireless power receiving apparatus in relation to the wireless power transmission apparatus.

In some implementations, the system may include at least one controller in the wireless power receiving apparatus or the wireless power transmission apparatus that is capable of preventing activation of a primary coil or a secondary coil based on a lack of proximity between the primary coil and the secondary coil.

In some implementations, the wireless power transmission apparatus may include a surface on which the wireless power receiving apparatus is placed, and wherein the wireless power receiving apparatus includes an electrical interface to charge a computer on the surface.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system or method for transmitting or receiving wireless power.

A traditional wireless power system may include a wireless power transmission apparatus and a wireless power receiving apparatus. The wireless power transmission apparatus may include a primary coil that transmits wireless energy (as a wireless power signal) to a corresponding secondary coil in the wireless power receiving apparatus. A primary coil refers to a source of wireless energy (such as inductive or magnetic resonant energy) in a wireless power transmission apparatus. A secondary coil is located in a wireless power receiving apparatus and receives the wireless energy. Wireless power transmission is more efficient when the primary and secondary coils are closely positioned. Conversely, the efficiency may decrease (or the power transfer may cease) when the primary and secondary coils are misaligned. When properly aligned, a set of primary coil and secondary coil can transfer wireless energy up to an amount predetermined by a wireless standard. For example, a low power wireless power signal may convey 5 Watts (W), 9 W, 12 W, or 15 W. Therefore, a low power wireless power system may deliver up to 15 Watts of energy which is suitable for many electronic devices.

Higher power wireless systems are being developed to support wireless power transmission to electronic devices that require more power (greater than 15 W). For example, a laptop computer, monitor, appliance, or other electronic device may use 65 W, 90 W or 120 W. A concern with higher power wireless systems is the amount of electromagnetic interference (EMI) that high power wireless systems may cause. The power transfer capability may be related to how closely the primary coil and secondary coil are positioned or aligned to each other. In this disclosure, alignment may refer to a spatial relationship between a secondary coil of the wireless power receiving apparatus and a primary coil of the wireless power transmission apparatus. A misalignment may reduce efficiency of the wireless power transfer or may cause an increase in wireless power signal from a primary coil to adjust for the misalignment. For example, a primary coil may output a higher amount of magnetic flux in order to meet the demand of a load associated with a secondary coil that is not well aligned. Undesirable EMI may be caused by excess magnetic flux that is not linked to the secondary coil.

In accordance with this disclosure, a wireless power system may utilize multiple primary coils and secondary coils to transfer wireless power from a wireless power transmission apparatus to a wireless power receiving apparatus. For example, each primary coil may transmit a low power signal (15 W or less) to a corresponding secondary coil. The wireless power receiving apparatus may combine wireless power from multiple secondary coils to provide a high-power wireless power to a load. For example, a wireless power receiving apparatus may combine 15 W from each of six secondary coils to provide a 90 W power signal to an electronic device. The activation of primary coils and number of secondary coils involved in power transfer may be based on alignment of the primary coils and secondary coils or the load demand, or both.

In some implementations, the wireless power transmission apparatus and the wireless power receiving apparatus may be manufactured according to a standardized wireless power specification, such as the Qi® specification provided by the Wireless Power Consortium. For example, the wireless power transmission apparatus may include multiple primary coils, where each primary coil may conform to the Qi specification. The wireless power receiving apparatus may include multiple secondary coils, where each secondary coil may conform to the Qi specification. While the Qi specification does not describe a wireless power receiving apparatus having multiple secondary coils, some implementations of this disclosure utilize multiple secondary coils to combine wireless power received from multiple Qi-compatible primary coils.

In some implementations, a charging surface of the wireless power transmission apparatus may have an array of primary coils in an overlapping arrangement. In some implementations, the primary coils may be configured in a non-overlapping arrangement. The arrangement of primary coils (overlapping or non-overlapping) may minimize, reduce, or eliminate dead zones. The design may distribute the areas of magnetic flux that is available to transfer power to a wireless power receiving apparatus on the charging surface. In some implementations, the wireless power transmission apparatus may be referred to as a zoneless charging pad. Depending on an orientation and position of the wireless power receiving apparatus on the charging surface, different primary coils may be activated to provide power to corresponding secondary coils of the wireless power receiving apparatus.

In some implementations, the wireless power receiving apparatus may have an array of secondary coils. In some implementations, more than one secondary coil of the wireless power receiving apparatus may be activated by a corresponding primary coil of the wireless power transmission apparatus. Depending on an alignment (or wireless power transfer efficiency), different ones of the secondary coils may be deactivated so that those secondary coils that remain activated have a high efficiency and good alignment. In some implementations, the wireless power receiving apparatus may use load sharing so that the amount of wireless power drawn by each activated secondary coil can be reduced.

Particular implementations of the subject matter described in this disclosure can be implemented to realize one or more of the following potential advantages. The wireless power system may cause less EMI and provide better efficiency of wireless power transfer compared to conventional wireless power systems that use only one wireless power signal. The electronics in both the wireless power transmission apparatus and wireless power receiving apparatus can utilize a modular design with components having a smaller power rating. The use of multiple primary coils or secondary coils (or both) may reduce an amount of wireless power transmitted by a primary coil that is only partially aligned with a secondary coil. Advantageously, implementations of this disclosure can support higher power for appliances and electronic devices that require greater amounts of power. Cost and complexity of the wireless power system may be reduced by using multiple low power wireless power signals to accommodate a greater wireless power transfer.

Figure 1:
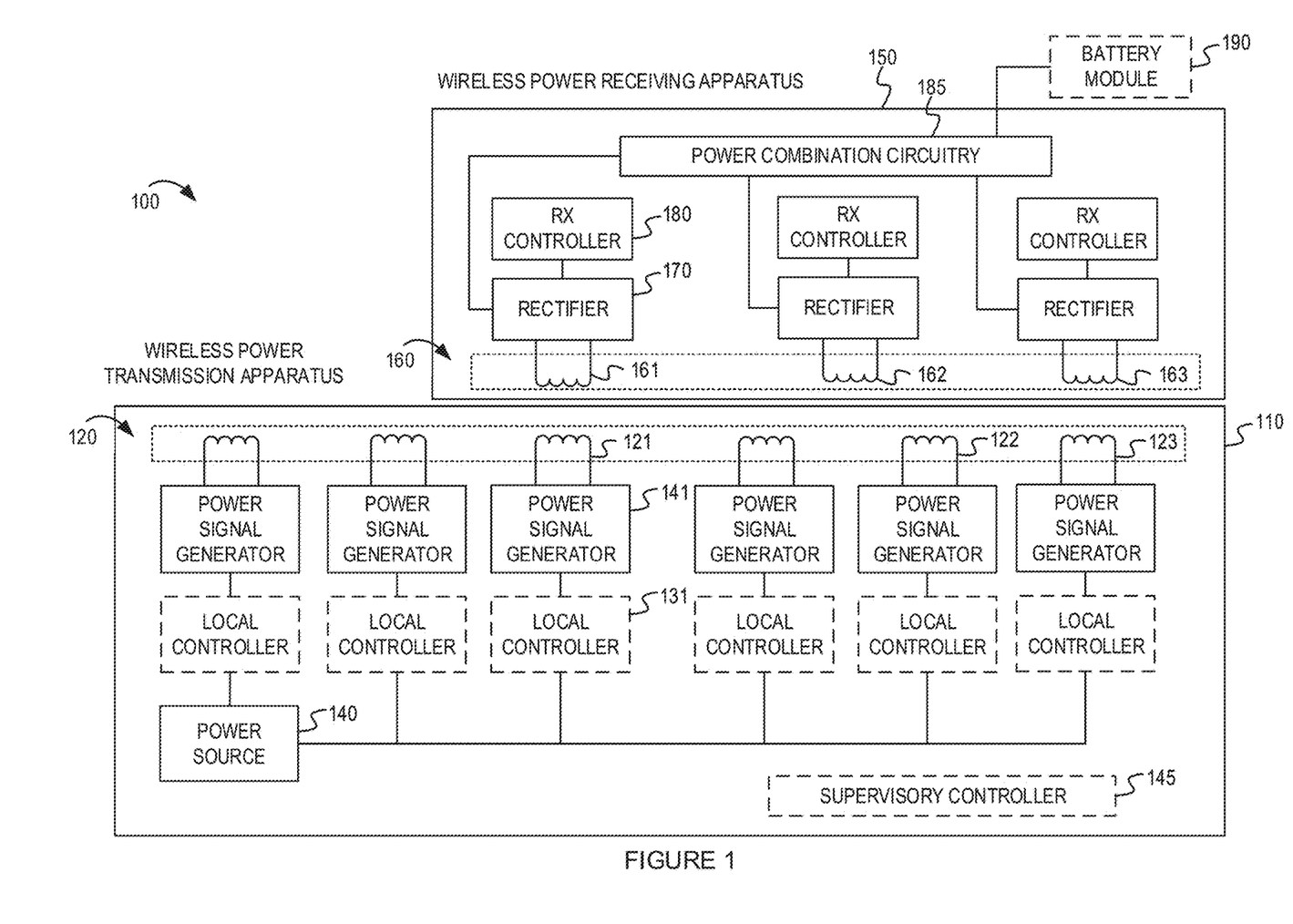
FIG. 1 shows an overview of components associated with an example wireless power system according to some implementations.

FIG. 1 shows an overview of components associated with an example wireless power system according to some implementations. The wireless power system 100 includes a wireless power transmission apparatus 110 which has multiple primary coils 120. Each of the primary coils 120 may be associated with a power signal generator. For example, a first primary coil 121 may be associated with power signal generator 141. Each primary coil may be a wire coil which transmits a wireless power signal (which also may be referred to as wireless energy). The primary coil may transmit wireless energy using inductive or magnetic resonant field. The power signal generator may include components (not shown) to prepare the wireless power signal. For example, the power signal generator may include one or more switches, drivers, a series of capacitors, or other components. The wireless power transmission apparatus 110 may include a power source 140 which is configured to provide power to each of the transmitter circuits in the wireless power transmission apparatus 110. The power source 140 may convert alternating current (AC) to direct current (DC). In some implementations, the primary coils 120 may have separate circuitry for each primary coil such that each primary coil can be energized independently.

The primary coils 120 may be managed by one or more controllers (such as communication and current/power controllers) that control whether the primary coil is transmitting wireless power. The primary coils 120 may be controlled by a single controller (such as a master controller). In some implementations, each primary coil may be associated with a different local controller, driver, voltage regulator, and the like. In some implementations, each primary coil may be coupled with separate circuit components like a capacitor (in series with the primary coil), a current sensing resistor, or other elements. Each local controller may determine whether to cause its associated primary coil to transmit wireless power. For example, the local controller may periodically activate one or more switches associated with the primary coil (and series capacitor) to excite (or briefly energize) the primary coil. The local controller may perform a coil current sensing process to determine if a wireless power receiving apparatus is located near the primary coil. If a wireless power receiving apparatus is detected, the local controller may activate one or more switches associated with the primary coil to cause the primary coil to transmit wireless power. In some implementations, a local controller may independently manage more than one primary coil. The local controller that receives a communication from the wireless power receiving apparatus in response to a ping action may determine that the wireless power receiving apparatus is latched to its primary coil. The local controller may cause its primary coil to provide wireless energy to the secondary coil of the wireless power receiving apparatus. The local controllers that are associated with nearby primary coils may continue to ping for the presence of a second wireless power receiving apparatus. In some implementations, a supervisory controller 145 may coordinate with multiple local controllers.

The controller (such as a master controller or each local controller) may be configured to detect the presence or proximity of a wireless power receiving apparatus. For example, the controller (master controller or each local controller) may cause their associated primary coils to periodically transmit a detection signal and measure for a change in coil current or load that indicates an object near the primary coil. In some implementations, the local controller may detect a ping, wireless communication, load modulation, or the like, to determine that a secondary coil of a wireless power receiving apparatus is near the primary coil.

FIG. 1 shows a wireless power receiving apparatus 150. A wireless power receiving apparatus may be integrated into any type of device capable of receiving wireless power, including a mobile phone, computer, laptop, peripheral, gadget, robot, vehicle, or other device. The wireless power receiving apparatus 150 may have an array of secondary coils 160, including a first secondary coil 161, a second secondary coil 162 and a third secondary coil 163. The secondary coils 160 may each be capable of receiving wireless power from a different primary coil. For example, when the first secondary coil 161 is positioned near the first primary coil 121, the first local controller 131 may detect its presence. For example, during a detection phase, the first primary coil 121 may transmit a detection signal (which also may be referred to as a ping). The coil current at the first primary coil 121 may be measured to determine whether the coil current has crossed a threshold indicating an object in the electromagnetic field of the first primary coil 121. If an object is detected, the first local controller 131 may wait for a handshake signal from the wireless power receiving apparatus 150 (such as an identification signal or setup signal) to determine whether the object is a wireless power receiving apparatus or a foreign object. The handshake signal may be communicated by the wireless power receiving apparatus 150 using a series of load changes (such as load modulations). The load changes may be detectable by a sensing circuit and interpreted by the first primary coil 121. The first primary coil 121 may interpret the variations in the load to recover the communication from the wireless power receiving apparatus 150. The communication may include information such as charging level, requested voltage, received power, receiver power capability, support for a wireless charging standard, or the like.

In the wireless power receiving apparatus 150, each of the secondary coils 160 may have separate circuitry, such as a rectifier 170 and a receive (RX) controller 180. Each secondary coil 160 that is properly aligned may generate an induced voltage based on the received wireless power signal from one of the primary coils 120. A capacitor (not shown) may be in series between the secondary coil and the rectifier. The rectifier may rectify the induced voltage and provide the induced voltage to a power combination circuitry 185 that combines power from multiple secondary coils. The power combination circuitry 185 may provide a combined wireless power to a load, such as a battery module 190. The battery module 190 may be in the wireless power receiving apparatus 150 or may be an external device that is coupled by an electrical interface. The battery module 190 may include a charger stage, protection circuits such as a temperature-detecting circuit, and overvoltage and overcurrent protection circuits.

Depending on the position of the wireless power receiving apparatus 150 in relation to the primary coils 120, some secondary coils may be aligned with a primary coil, while some other secondary coils may not be aligned with a primary coil. For example, in FIG. 1, the first secondary coil 161 may be aligned with a first primary coil 121 and a third secondary coil 163 may be aligned with a third primary coil 123. However, the second secondary coil 162 may not be aligned with a primary coil or may have a poor alignment (such as with the second primary coil 122). Each RX controller (or a supervisory controller of the wireless power receiving apparatus 150, not shown) may determine whether to receive power from particular secondary coils based on one or more conditions. For example, the determination that a secondary coil is well aligned may be based on an efficiency metric or communication with a corresponding primary coil. In the example of FIG. 1, the second secondary coil 162 may be deactivated based on one or more conditions, such as because the second secondary coil 162 does not have a good magnetic coupling with the second primary coil 122. Similarly, the wireless power transmission apparatus 110 may determine which primary coils to transmit wireless power. A controller (such as a master controller or each of the local controllers) of the wireless power transmission apparatus 110 may activate the first primary coil 121 and the third primary coil 123 to provide wireless power to the wireless power transmission apparatus 110. The controller may deactivate the second primary coil 122 due to poor alignment or low efficiency of wireless power transfer.

Figure 2:
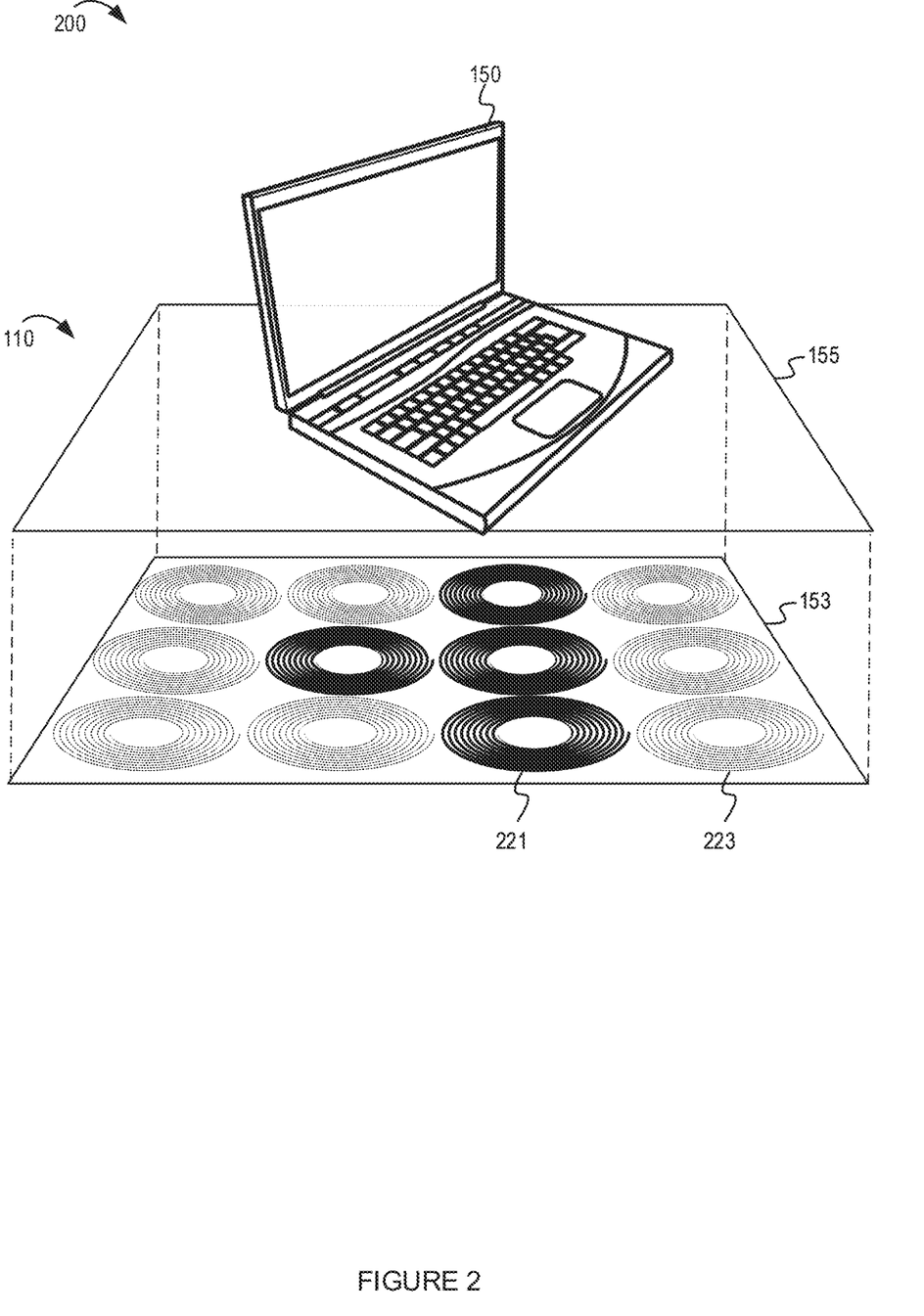
FIG. 2 shows an example wireless power system that includes a wireless power receiving apparatus capable of receiving power from multiple primary coils of a wireless power transmission apparatus according to some implementations.

FIG. 2 shows an example wireless power system 200 that includes a wireless power receiving apparatus 150 capable of receiving power from multiple primary coils of a wireless power transmission apparatus 110 according to some implementations. The example wireless power transmission apparatus 110 includes 12 primary coils (shown in portion 153). However, the quantity and arrangement of primary coils are provided as an example. Other quantities of primary coils, number of layers, or arrangements may be possible. A charging surface 155 may house the primary coils. The wireless power receiving apparatus 150 may be placed on the charging surface 155. Although shown as a laptop, the wireless power receiving apparatus 150 may be any type of electronic device. Furthermore, the wireless power receiving apparatus 150 may be a component integrated into the electronic device or may be an external component or attachment that couples to the electronic device. In FIG. 2, the wireless power receiving apparatus 150 is positioned on the charging surface 155 such that a first set of primary coils 221 are activated to transmit wireless power while other primary coils (such as primary coil 223) are deactivated. The deactivated primary coils may periodically activate for ping or detection to detect for presence of a secondary coil (either due to movement of the wireless power receiving apparatus 150 or from another wireless power receiving apparatus, not shown). Inside the wireless power receiving apparatus 150 (such as inside a bottom surface portion of the laptop), there are a plurality of secondary coils (not shown) that are latched to the activated primary coils 221.

Figure 3:
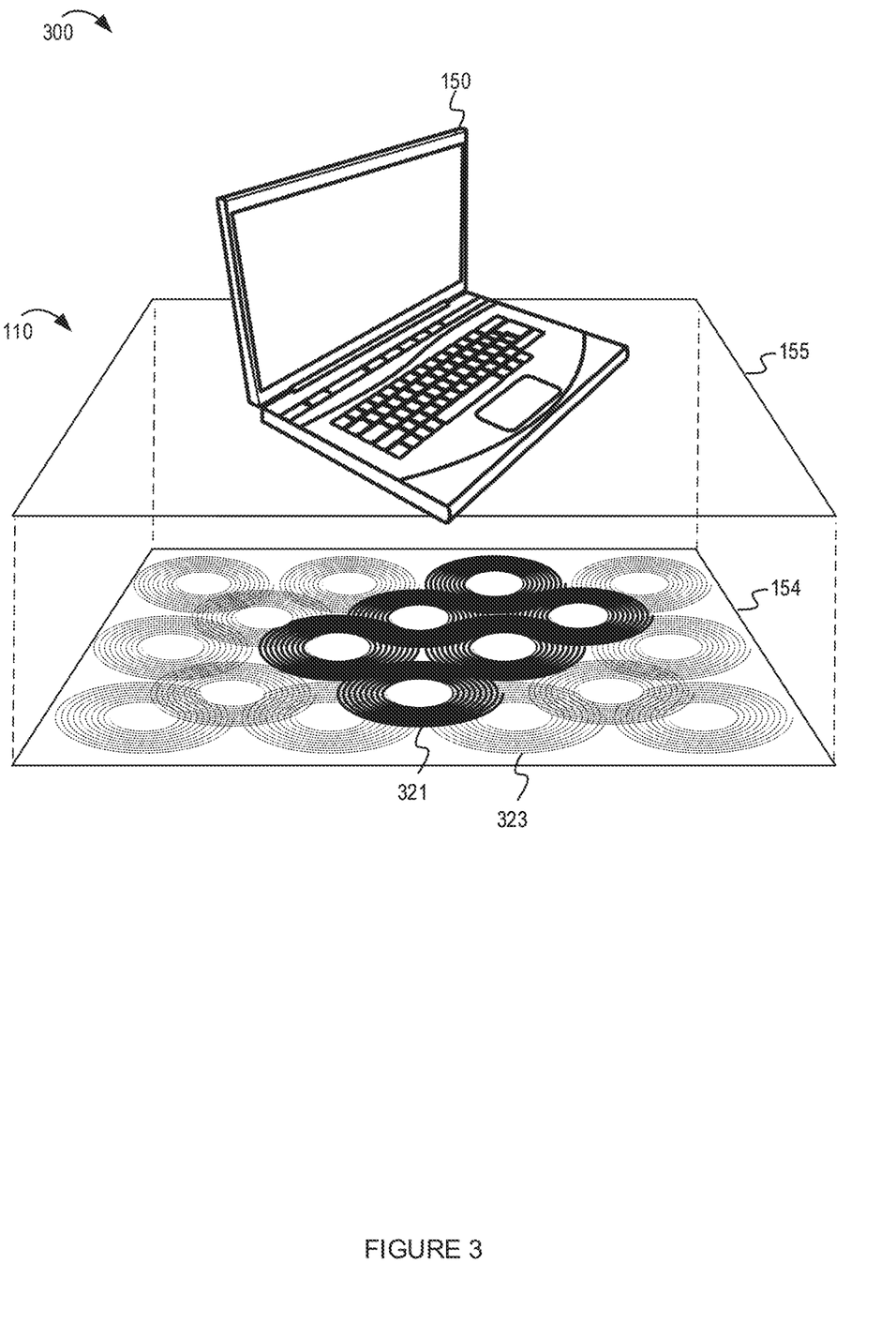
FIG. 3 shows an example wireless power system in which a wireless power transmission apparatus includes multiple layers of primary coils arranged in an overlapping pattern according to some implementations.

FIG. 3 shows an example wireless power system 300 in which a wireless power transmission apparatus 110 includes multiple layers of primary coils arranged in an overlapping pattern according to some implementations. The example wireless power transmission apparatus 110 includes 18 primary coils arranged in overlapping layers (shown in portion 154). The quantity and arrangement of primary coils are provided as an example. Other quantities of primary coils, number of layers, or arrangements may be possible. The wireless power receiving apparatus 150 may be placed on a charging surface 155 of the wireless power transmission apparatus 110. A first set of primary coils 321 may be activated to transmit wireless power to corresponding secondary coils (not shown) in the wireless power receiving apparatus 150. Other primary coils 323 may be deactivated. Although FIG. 3 shows that some of the activated coils are overlapping, in some implementations, the wireless power transmission apparatus 110 may refrain from activating overlapping coils.

In implementations when the wireless power transmission apparatus 110 or the wireless power receiving apparatus 150 (or both) implement overlapping coils, the pattern of overlapping coils may reduce an amount of area where a wireless power signal is exposed (or not aligned with a secondary coil). This may have the result of reducing EMI. Furthermore, by activating multiple primary coils 321, the amount of power contributed by each activated primary coil 321 may be lowered. Lower power transmission for each primary coil may reduce the amount of EMI and other interference to other components of the wireless power receiving apparatus 150 (or the electronic device which it powers).

Figure 4:
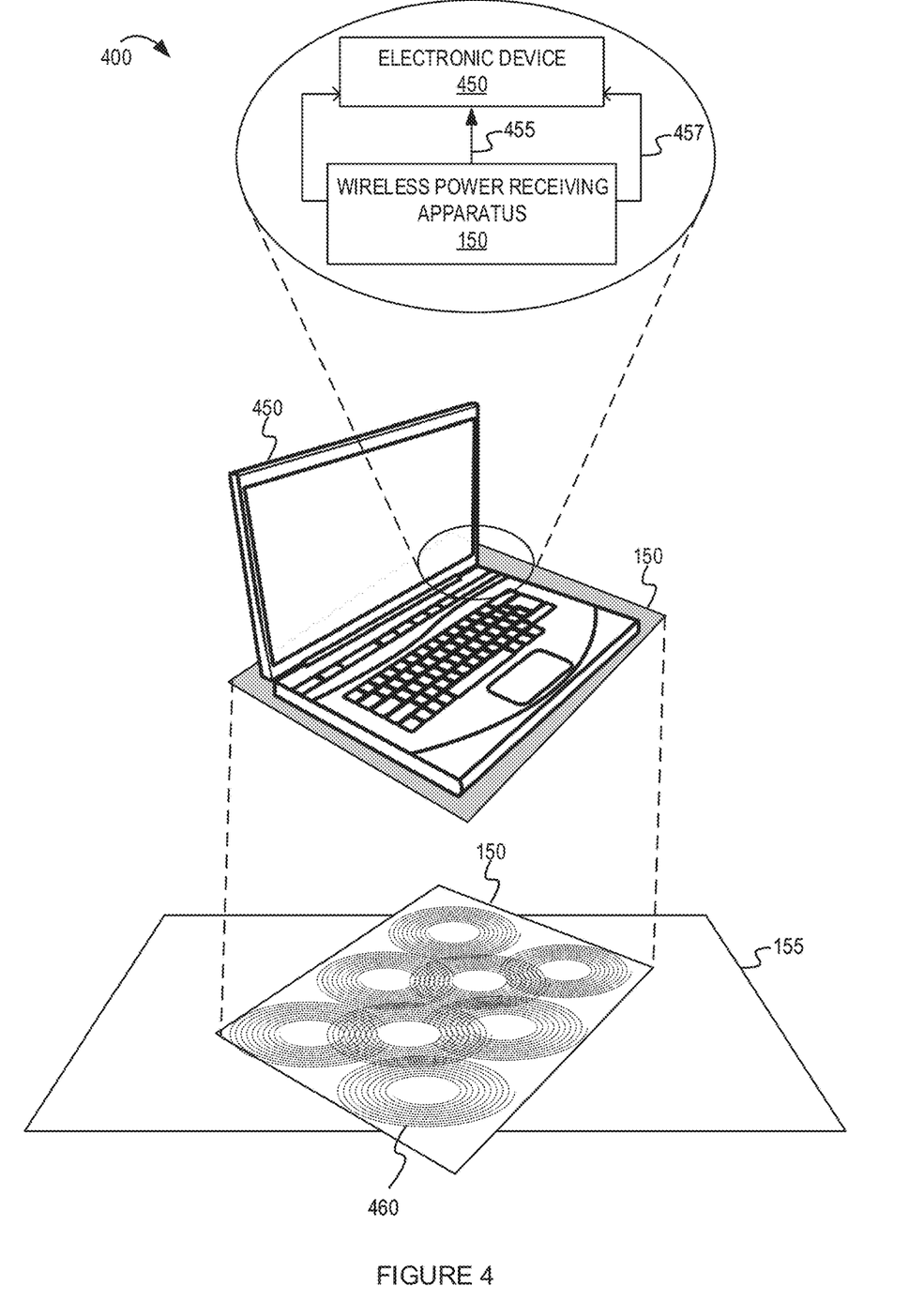
FIG. 4 shows an example wireless power system in which a wireless power receiving apparatus is configured to provide power to an electronic device according to some implementations.

FIG. 4 shows an example wireless power system 400 in which a wireless power receiving apparatus 150 is configured to provide power to an electronic device 450 according to some implementations. In FIG. 4, the wireless power receiving apparatus 150 may be a wireless power pad that has multiple secondary coils 460. In the example of FIG. 4, the secondary coils are arranged in an overlapping pattern. The wireless power receiving apparatus 150 may have an electrical interface 455 or other connection that provides power from the wireless power receiving apparatus 150 to the electronic device 450. In some implementations, a fastener 457 (such as a clip, magnet, button, casing, or the like) may be used to physical couple the wireless power receiving apparatus 150 to the electronic device 450. The fastener 457 may be part of the wireless power receiving apparatus 150, the electronic device 450, or both. For example, the wireless power receiving apparatus 150 include a housing that contains the secondary coils, and the housing may attach to a laptop or tablet.

Figure 5:
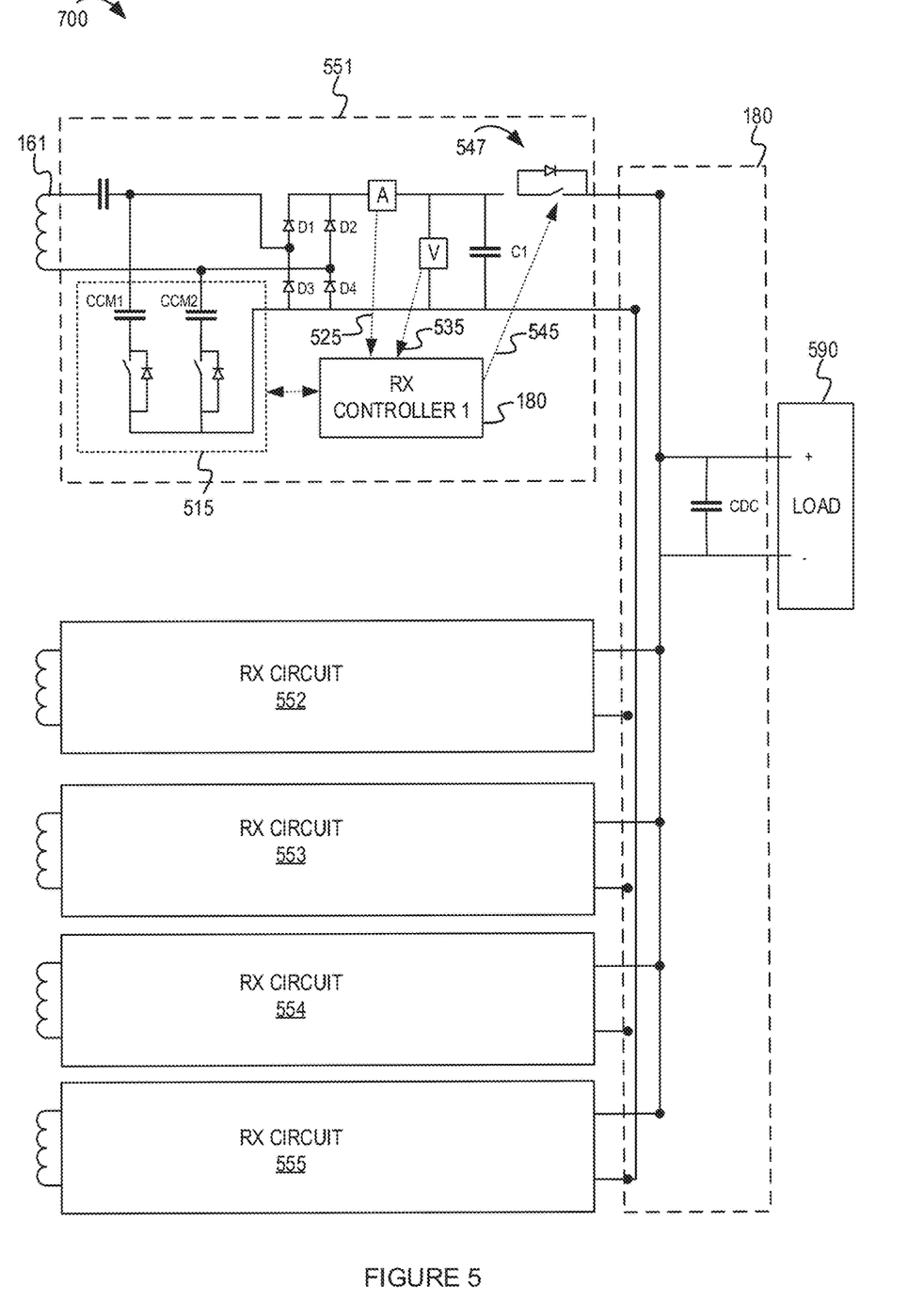
FIG. 5 shows an example receiver circuit which may be associated with a wireless power receiving apparatus according to some implementations.

FIG. 5 shows an example receiver circuit 500 which may be associated with a wireless power receiving apparatus (such as the wireless power receiving apparatus 150) according to some implementations. The example in FIG. 5 shows a collection of wireless power receiver (RX) circuits 551, 552, 553, 556, and 555 arranged in a parallel circuit. The quantity of RX circuits is an example and other quantities or arrangements may be used in various implementations. Furthermore, while FIG. 5 shows a parallel circuit, it is possible to arrange the RX circuits in series or in a combined series-parallel arrangement. The RX circuits 551, 552, 553, 554, and 555 are coupled to a RX controller 180 that provides a combined power signal to a load 590. The load 590 may be a battery charger or may be other components of an electrical device.

A first RX circuit 551 is shown with additional detail for example purposes. A secondary coil couples to the RX circuit 551. An RX controller 180 may utilize a communication and control circuit 515 to detect a ping from a primary coil (not shown) of a wireless power transmission apparatus. The RX controller 180 also may communicate with the primary coil by causing pulses or modulation in switches of the communication and control circuit 515. The RX controller 180 also may receive a current sense measurement 525, or a voltage sense measurement 535, or both. When a wireless power signal is detected, the RX controller 180 may enable a switch 547 (via an enable line 545) to allow power to flow to the RX controller 180. In some implementations, the switch 547 may be located in the RX controller 180 instead of the RX circuit 551. The RX controller 180 may use the voltage sense measurement 535 or the current sense measurement 525 to determine whether the first secondary coil 161 is aligned with a corresponding primary coil. In some implementations, the RX controller 180 also may determine an amount of power drawn by the RX controller 180 and may cause an adjustment to the amount of power received by the first secondary coil 161. For example, the RX controller 180 may cause a communication (via the communication and control circuit 515) to the primary coil to cause the primary coil to decrease an amount of wireless power if the RX controller 180 is drawing less power than is currently produced. Each of the RX circuits 551, 552, 553, 554, and 555 (either independently or by a supervisory controller, not shown) may adjust how much power is transferred by their respective secondary coil based on the total power drawn by the RX controller 180. In some implementations, each of the activated RX circuits may use a same power for the wireless power transfer at their respective secondary coils. In some implementations, the RX circuits may use different power levels based on how efficient the wireless power transfer is for each secondary coil.

Figure 6:
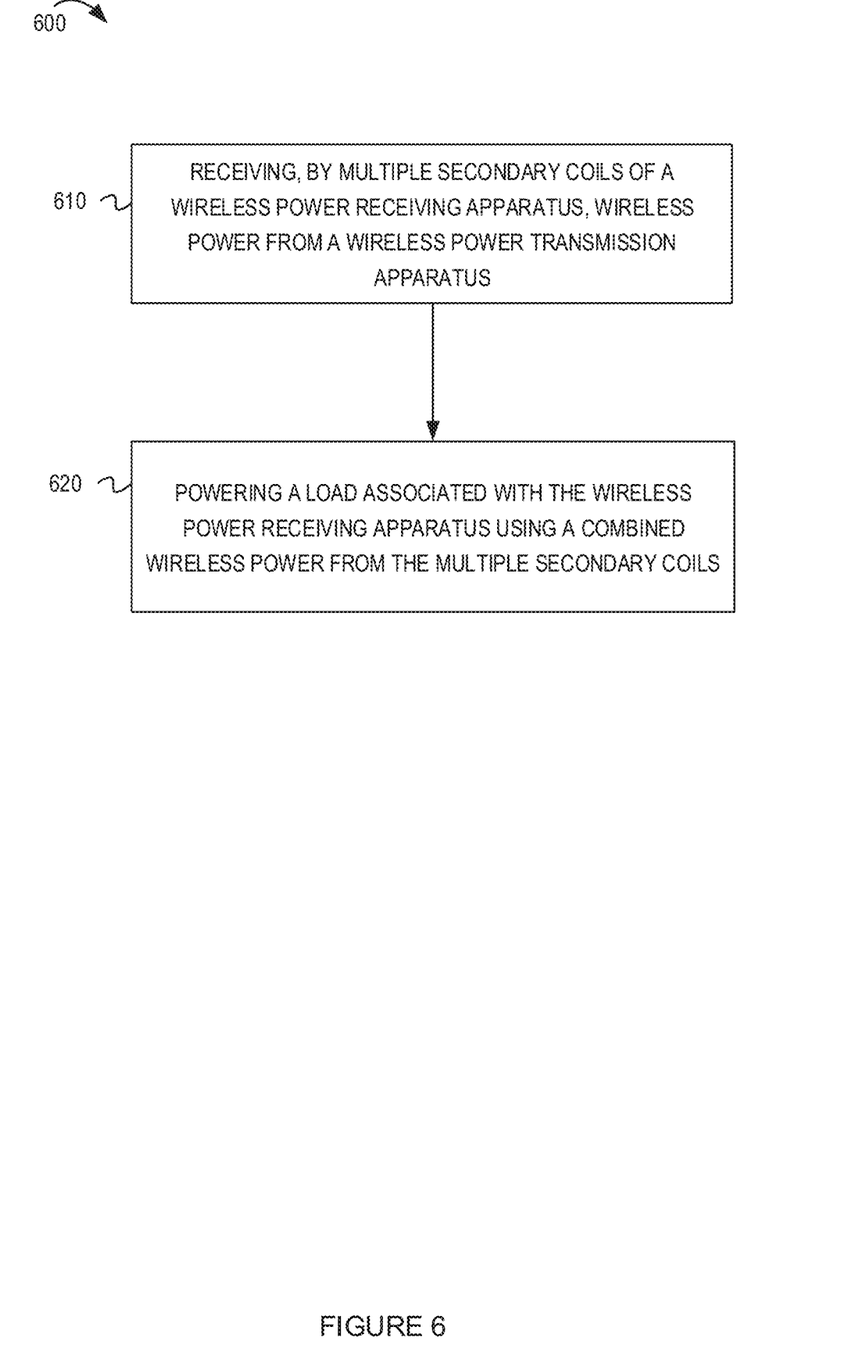
FIG. 6 shows a flowchart illustrating an example process for wireless power transmission according to some implementations.

FIG. 6 shows a flowchart illustrating an example process for wireless power transmission according to some implementations. The flowchart 600 begins at block 610. At block 610, the process includes receiving, by multiple secondary coils of a wireless power receiving apparatus, wireless power from a wireless power transmission apparatus. For example, the wireless power receiving apparatus may rectify wireless power at each of the multiple secondary coils. The wireless power receiving apparatus may combine the rectified wireless power to prepare the combined wireless power. At block 620, the process includes powering a load associated with the wireless power receiving apparatus using a combined wireless power from the multiple secondary coils.

In some implementations, the wireless power receiving apparatus may determine which secondary coils from among a plurality of secondary coils to use to receive wireless power based, at least in part, on a proximity of the secondary coils to corresponding primary coils of the wireless power transmission apparatus. For example, the selection of secondary coils may be based on communication with a corresponding primary coil. In some implementations, the secondary coil may be used to determine a power transfer efficiency (such as a quality metric). The power transfer efficiently (such as the quality metric) may be communicated to the wireless power transmission apparatus. If the power transfer efficiency is below a threshold, the wireless power transmission apparatus may determine that a secondary coil is not well aligned and may deactivate the corresponding primary coil.

Figure 7:
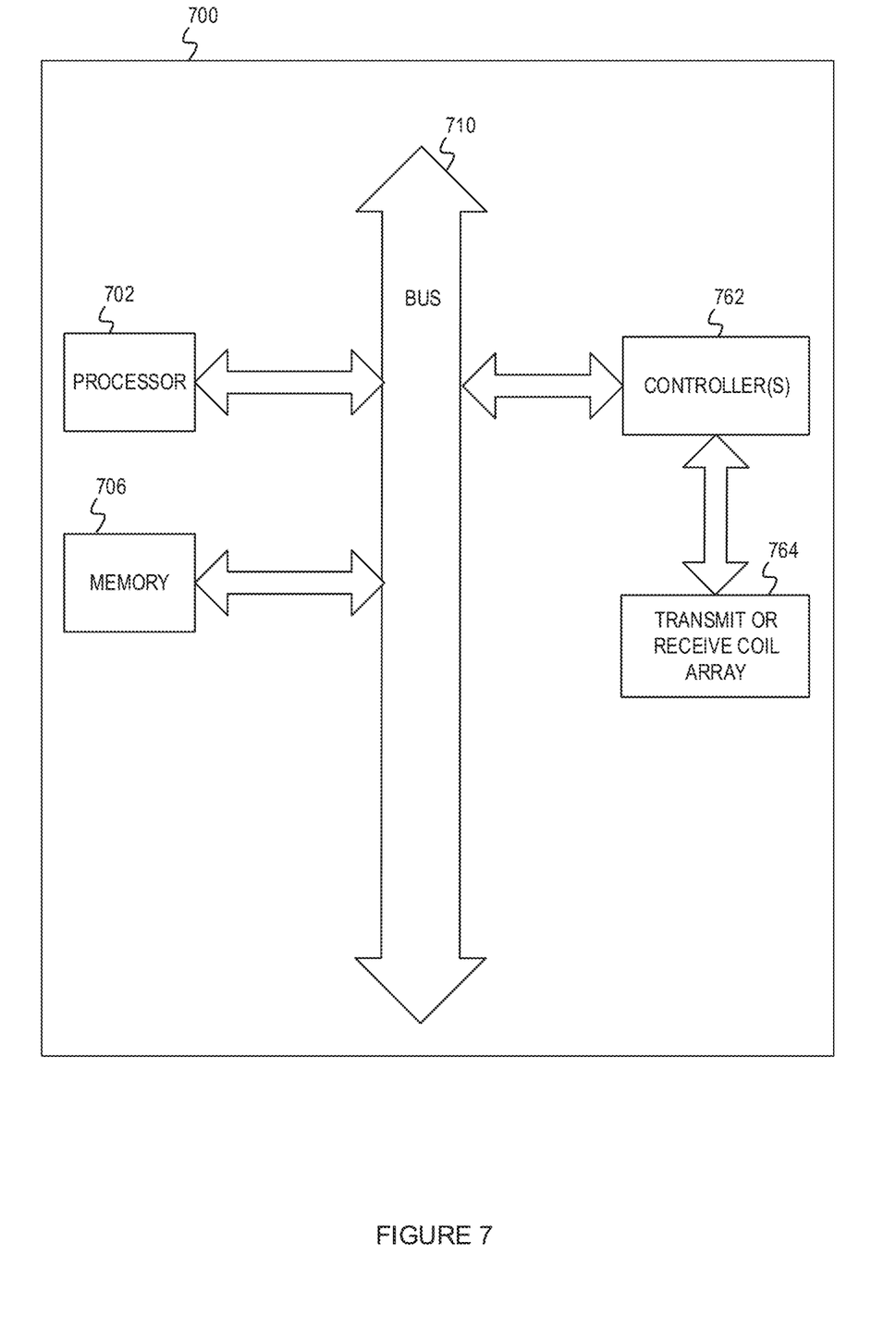
FIG. 7 shows a block diagram of an example apparatus for use in wireless power system according to some implementations.

FIG. 7 shows a block diagram of an example apparatus for use in wireless power system according to some implementations. In some implementations, the apparatus 700 may be a wireless power transmission apparatus (such as the wireless power transmission apparatus 110) or a wireless power receiving apparatus (such as the wireless power receiving apparatus 150). The apparatus 700 can include a processor 702 (possibly including multiple processors, multiple cores, multiple nodes, or implementing multi-threading, etc.). The apparatus 700 also can include a memory 706. The memory 706 may be system memory or any one or more of the possible realizations of computer-readable media described herein. The apparatus 700 also can include a bus 710 (such as PCI, ISA, PCI-Express, HyperTransport®, InfiniBand®, NuBus,® AHB, AXI, etc.).

The apparatus 700 may include one or more controller(s) 762 configured to manage multiple primary coils or secondary coils (transmit or receive coil array 764). In some implementations, the controller(s) 762 can be distributed within the processor 702, the memory 706, and the bus 710. The controller(s) 762 may perform some or all of the operations described herein. The memory 706 can include computer instructions executable by the processor 702 to implement the functionality of the implementations described in FIGS. 1-6. Any one of these functionalities may be partially (or entirely) implemented in hardware or on the processor 702. For example, the functionality may be implemented with an application specific integrated circuit, in logic implemented in the processor 702, in a co-processor on a peripheral device or card, etc. Further, realizations may include fewer or additional components not illustrated in FIG. 7. The processor 702, the memory 706, and the controller(s) 762 762 may be coupled to the bus 710. Although illustrated as being coupled to the bus 710, the memory 706 may be coupled to the processor 702.

FIGS. 1-7 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless power receiving apparatus, comprising:
a plurality of secondary coils, wherein each secondary coil is capable of receiving wireless power from a different primary coil of a plurality of primary coils of a wireless power transmission apparatus;
at least one controller configured to:
activate multiple secondary coils, of the plurality of secondary coils, to receive wireless power from the wireless power transmission apparatus based, at least in part, on an amount of combined wireless power to provide to a load, and
deactivate at least one other secondary coil of the plurality of secondary coils based on at least one of:
a first determination that deactivation of the other secondary coil improves power transfer efficiency of the activated multiple secondary coils, or
a second determination that the load is using less power than the combined wireless power; and
deactivate at least one other secondary coil of the plurality of secondary coils based on a determination that the load is using less power than the combined wireless power; and
a power combination circuitry that combines the wireless power from the activated multiple secondary coils and provides the combined wireless power to the load.

2. The wireless power receiving apparatus of claim 1, further comprising:
an electrical interface to electrically couple the power combination circuitry of the wireless power receiving apparatus to the load, wherein the power combination circuitry provides the combined wireless power to the load via the electrical interface.

3. The wireless power receiving apparatus of claim 2, further comprising:
a housing for the plurality of secondary coils, the housing designed to attach to an electronic device and the load is in the electronic device.

4. The wireless power receiving apparatus of claim 1, wherein each of the plurality of secondary coils is capable of inductive reception of a low power wireless signal in accordance with a wireless charging standard.

5. The wireless power receiving apparatus of claim 4, wherein the power combination circuitry is configured to combine wireless power from multiple low power wireless signals from different secondary coils.

6. The wireless power receiving apparatus of claim 5, wherein the power combination circuitry is configured to provide the combined wireless power as a high-power signal to the load.

7. The wireless power receiving apparatus of claim 6, wherein each of the multiple low power wireless signals are not over 15 Watts, and wherein the combined wireless power is over 15 Watts.

8. The wireless power receiving apparatus of claim 1, wherein the plurality of secondary coils are arranged in an overlapping pattern.

9. The wireless power receiving apparatus of claim 1,
wherein the at least one controller is further configured to:
manage how much wireless power is received by each activated secondary coil of the plurality of secondary coils, and
cause communication of one or more measurement signals or one or more control error signals for each activated secondary coil to its corresponding primary coils.

10. The wireless power receiving apparatus of claim 1, wherein the multiple secondary coils include a first secondary coil and a second secondary coil, and wherein the first secondary coil and the second secondary coil contribute same amounts of wireless power to the combined wireless power.

11. The wireless power receiving apparatus of claim 1, wherein the multiple secondary coils include a first secondary coil and a second secondary coil, and wherein the first secondary coil and the second secondary coil contribute different amounts of wireless power to the combined wireless power.

12. The wireless power receiving apparatus of claim 11, wherein the different amounts of wireless power contributed by the first secondary coil and the second secondary coil are based, at least in part, on an alignment of the first secondary coil and the second secondary coil to a first primary coil and a second primary coil, respectively.

13. A wireless power transmission apparatus, comprising:
a plurality of primary coils, wherein each primary coil is capable of transmitting wireless power to a wireless power receiving apparatus;
a plurality of local controllers to separately control corresponding ones of the plurality of primary coils based on proximity of a respective secondary coil, the plurality of local controllers including at least one local controller configured to:

activate multiple primary coils of the plurality of primary coils to separately and concurrently transmit wireless power to corresponding secondary coils of the wireless power receiving apparatus based on alignment of the multiple primary coils and the corresponding secondary coils, a load demand of the wireless power receiving apparatus, or both;

deactivate at least one other primary coil of the plurality of primary coils; and manage an amount of power concurrently transmitted by each of the multiple primary coils.

14. The wireless power transmission apparatus of claim 13, further comprising:

a charging pad housing the plurality of primary coils on which the wireless power receiving apparatus may be placed.

15. The wireless power transmission apparatus of claim 14, wherein the charging pad includes a surface on which the wireless power receiving apparatus may be placed in any orientation.

16. The wireless power transmission apparatus of claim 13, wherein each of the plurality of primary coils is capable of inductive transmission of a low power wireless power signal in accordance with a wireless charging standard.

17. The wireless power transmission apparatus of claim 13, wherein the plurality of primary coils is arranged in an overlapping pattern.

18. The wireless power transmission apparatus of claim 13, further comprising:

a supervisory controller configured to coordinate with the plurality of local controllers to manage the amount of power transmitted by each of the multiple primary coils.

19. The wireless power transmission apparatus of claim 13, further comprising:

a supervisory controller configured to manage the amount of power transmitted by the multiple primary coils by setting a limit on power transmitted by each of the multiple primary coils.

20. The wireless power transmission apparatus of claim 19, wherein the limit is set based, at least in part, on power sharing by the multiple primary coils.

21. The wireless power transmission apparatus of claim 19, wherein the limit is set based, at least in part, on a thermal or electrical hardware characteristic of a primary coil.

22. The wireless power transmission apparatus of claim 13, wherein the multiple primary coils that transmit wireless power to the corresponding secondary coils do not include other primary coils that are misaligned with a secondary coil of the wireless power receiving apparatus.

23. A method of a wireless power receiving apparatus, the method comprising:

activating multiple secondary coils of a plurality of secondary coils of the wireless power receiving apparatus to receive wireless power from a wireless power transmission apparatus based, at least in part, on an amount of combined wireless power to provide to a load, wherein each secondary coil is capable of receiving the wireless power from a different primary coil of a plurality of primary coils of the wireless power transmission apparatus;

deactivating at least one other secondary coil of the plurality of secondary coils based on a determination that the load is using less power than the combined wireless power;

combining the wireless power from the activated multiple secondary coils; and providing the combined wireless power to the load associated with the wireless power receiving apparatus.

24. The method of claim 23, further comprising:

determining a desired power amount for each active one of the plurality of secondary coils such that all active ones of the plurality of secondary coils contribute to the combined wireless power; and selecting the multiple secondary coils to activate based on those of the plurality of secondary coils that can receive the desired power amount.

25. The method of claim 23, wherein the deactivating the at least one other secondary coil includes:

determining that the at least one other secondary coil is not as well aligned compared to the activated multiple secondary coils; and deactivating the at least one other secondary coil to improve the power transfer efficiency of the multiple secondary coils that remain activated.

* * * * *